W. REDHEFFER.
Egg-Beaters.

No. 146,710. Patented Jan. 20, 1874.

Witnesses
Philip F. Larner
A. B. Cauldwell

Inventor
William Redheffer
By Wm C Wood
Attorney

UNITED STATES PATENT OFFICE.

WILLIAM REDHEFFER, OF KANSAS CITY, MISSOURI, ASSIGNOR TO EDWARD R. THRELKELD, OF SAME PLACE.

IMPROVEMENT IN EGG-BEATERS.

Specification forming part of Letters Patent No. 146,710, dated January 20, 1874; application filed October 25, 1873.

*To all whom it may concern:*

Be it known that I, WILLIAM REDHEFFER, of Kansas city, in the county of Jackson and State of Missouri, have invented certain new and useful Improvements in Egg-Beaters.

My improvements relate to that class of beaters in which a reciprocating plunger is employed; and my invention consists in the peculiar construction of the beater, whereby, on every downward movement, the mass to be beaten is discharged in radial jets or streams, which strike the sides of the surrounding chamber with great force, and rapidly effect the egg-beating process; and I do hereby declare that the following specification, taken in connection with the drawings furnished and forming a part of the same, is a clear and true description thereof.

Figure 1:
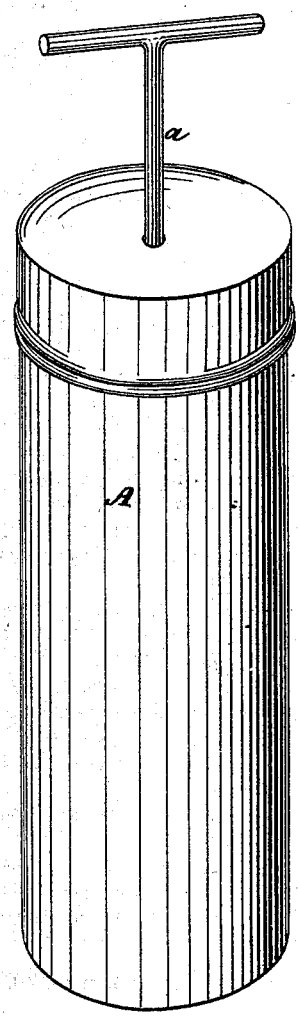
Figure 2:
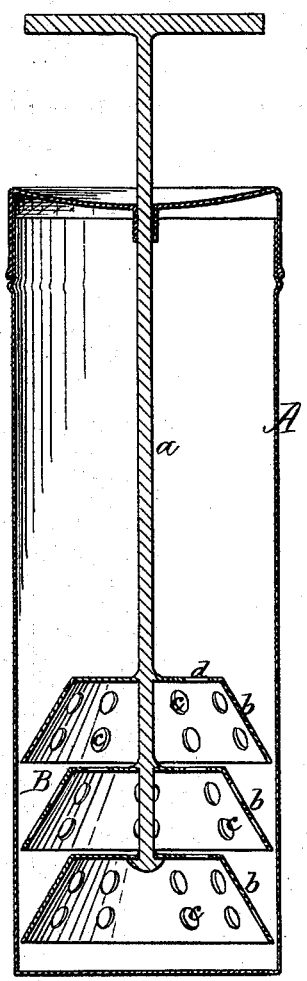
Figure 3:
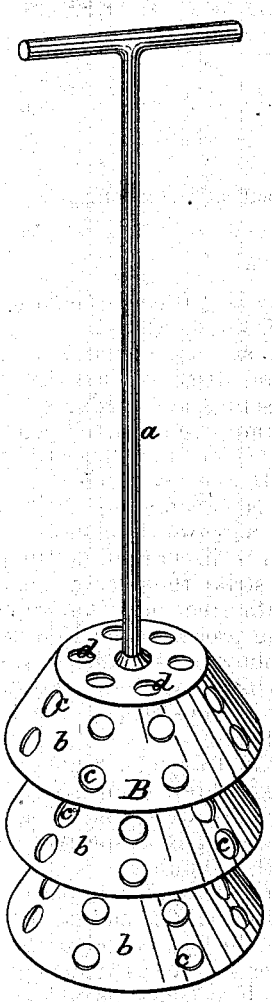

In the drawings, Figure 1 represents one of my egg-beaters complete in perspective. Fig. 2 represents the same in vertical section. Fig. 3 represents in perspective the beater detached from the chamber.

A denotes the chamber or receiver, which is provided with a close cap or cover, through which the beater-rod or handle $a$ passes. B denotes the beater, which is composed of several hollow frustums of cones, $b$, each of which is perforated with holes $c$. The holes $c$ in each frustum are arranged so that they will be out of coincidence with the holes in the adjacent frustum, in order that the stream projected through each hole will uninterruptedly strike the inner wall of the receiver as the beater is driven downward. On being raised, a lateral current of a portion of the mass to be beaten flows inward through each aperture; and the practical effect is to rapidly and thoroughly beat the mass into the required condition.

The holes $d$ in the ends of the frustums may be employed, if desired, as a means for creating counter-currents, and for assisting to charge the beaten mass with air.

It is to be understood that I am well aware that perforated dashers are not new in egg-beaters and churns; and I well know that, in some cases, they have beeen made concavo-convex; but in those cases the jets or streams forced through the perforations are not projected forcibly against the walls of the receiver, as in my improved egg-beater; and I therefore claim as new, to be secured by Letters Patent—

The reciprocating egg-beater, composed of the covered receiver and the beater, consisting of several hollow perforated frustums of cones, as shown and described.

WILLIAM REDHEFFER.

Witnesses:
CLAUDE L. THRELKELD,
A. R. FRENCH.